Figure 1:
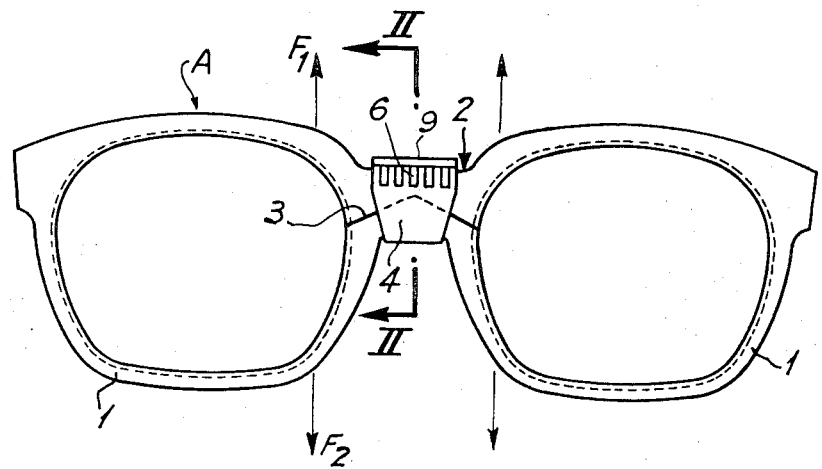

United States Patent
Bolle

[11] 3,801,189
[45] Apr. 2, 1974

[54] SPECTACLE FRAME WITH SPLIT BRIDGE AND CLIP-ON MEANS FOR SECURING SAME

[76] Inventor: Robert Seraphin Victor Bolle, 58 route de Marchon, Ain, France

[22] Filed: June 19, 1972

[21] Appl. No.: 264,282

[30] Foreign Application Priority Data
June 25, 1971   France .............................. 71.23289

[52] U.S. Cl. ...... 351/92, 351/52, 351/95, 351/97, 351/98, 351/129, 351/130, 351/152
[51] Int. Cl. ...... G02c 1/08, G02c 5/02, G02c 11/02
[58] Field of Search ......... 351/97, 98, 129, 52, 152, 351/92, 95, 130

[56] References Cited
UNITED STATES PATENTS
2,551,144   5/1951   Lindemann et al. ................... 351/97
1,338,508   4/1920   Johnston et al. ................... 351/97 X
2,380,281   7/1945   Whipple ................................ 351/98

Primary Examiner—Paul A. Sacher
Attorney, Agent, or Firm—Karl F. Ross; Herbert Dubno

[57] ABSTRACT

A spectacle frame of the type having a pair of lens-holding rings joined by a bridge split into two parts by a cut extending from one lens-holding ring to the other is described. The frame is shown to include a decorative spring-steel fastener removaly fitted on the front of the bridge and engaging the upper and lower surfaces of the bridge so as to hold the two parts of the bridge together. The fastener has a curved extremity engaging the lower surface of the bridge, a concave front face, and a slotted latching extremity engaging the upper surface of the bridge, the latter extremity being provided with a tongue for removal of the fastener.

6 Claims, 3 Drawing Figures

PATENTED APR 2 1974 3,801,189

SPECTACLE FRAME WITH SPLIT BRIDGE AND CLIP-ON MEANS FOR SECURING SAME

The present invention relates to spectacle frames which enable lenses readily to be changed or replaced.

Spectacle frames are known in which a cut is formed in the bridge connecting the rings that accommodate the lenses, the cut extending from one ring to the other to enable the rings to be opened up simultaneously, a screw being provided extending through the bridge perpendicularly to the cut for the purpose of holding the two parts of the bridge together.

An arrangement of this kind is particularly suitable in frames made of plastic material. The lenses are usually fitted in such frames of plastic material by heating the frames so as to soften the material thereof and to enable the lenses to be inserted without opening the rings; however, in the type of frame having a slotted bridge, the rings can be opened up which avoids the need for heating the frame and enables deep bezels to be used to ensure that the lenses are securely fixed.

The use of screws for connecting the two parts of the bridge calls for thickening of the latter, and this adversely affects the appearance of the spectacles.

It is an object of the invention to provide an improved spectacle frame.

In accordance with my present invention, a spectacle frame of the aforedescribed type is provided with a resilient clip engaging its split bridge from above and from below to urge the upper and lower bridge parts (which are integral with the split lens-holding rings) into mutual contact along a cut having a stepped profile in a vertical transverse plane, this profile causing the two parts to overlap over a predetermined range of relative vertical displacement. Advantageously, the top and bottom extremities of the clip are curved about projecting formations or ridges of these parts for positive engagement therewith; with the profile of the cut defining a vertical contact surface between the two parts, I prefer to bend one of these extremities about its associated ridge forwardly of the contact surface whereas the other extremity is bent about its ridge rearwardly of that surface. A midportion of the clip between its extremities may be curved toward the bridge to bear resiliently upon same in the region of the cut.

Figure 2:
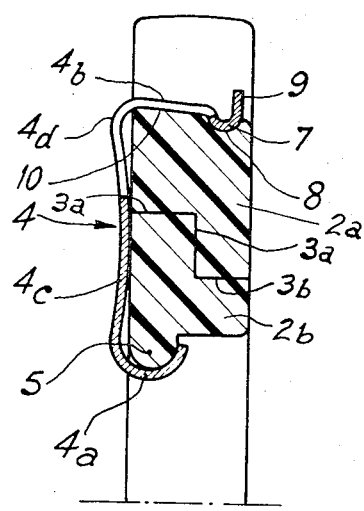
Figure 3:
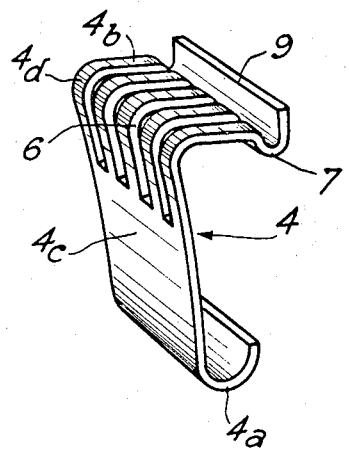

By way of example only, an illustrative embodiment of the invention will now be described with reference to the accompanying drawing in which:

FIG. 1 shows a front view of a spectacle frame embodying the invention;

FIG. 2, drawn to an enlarged scale, shows a section on line II — II of FIG. 1; and FIG. 3 is a perspective view of a fastener used to hold the bridge of the spectacle frame together.

The lens frame A shown in FIG. 1 comprises two rings 1 for holding the lenses, these rings being interconnected by the bridge 2. The latter contains a cut 3 which extends from one ring to the other and enables these two lens rings to be simultaneously opened up by pulling in opposite directions as indicated by the arrows $F_1$ and $F_2$.

The cut 3 is so formed as to ensure that the two opposing faces of the slot automatically interlock with each other. For this purpose the cut, as seen from the front, extends along an angled or indented line which transversely, as shown in FIG. 2, the cut comprises a shoulder or stepped portion for maintaining an overlap between the upper and lower bridge parts 2a, 2b, meeting at a vertical contact surface 3c, even if the lenses are slightly oversized so as to dilate the rings.

The parts 2a, 2b are urged toward each other by a clip 4, made from spring steel, whose lower extremity 4a, inwardly curved to a part-cylindrical form, embraces and can pivot about a rounded ridge 5 formed on the lower edge of the bridge whereas the upper extremity 4b of the clip comprises, toward the rear, a pressed-out rib 7 which resiliently engages in a groove 8 in the upper edge of the bridge. With groove 8 disposed rearwardly of contact surface 3c, clip extremity 4b is curved about a ridge 10 wider than ridge 5 which is embraced by clip extremity 4a terminating ahead of that contact surface. It will be noted that the cut 3 extends at a higher level 3a, remote from extremity 4a, forwardly of surface 3c and at a lower level 3b, remote from extremity 4b, rearwardly of surface 3c whereby each of these extremities ends at a point where the engaged bridge part has the greater depth.

To impart the required resiliency to the clip, its front face 4c can be slightly concave as illustrated. Furthermore, the bend 4d in the upper edge can be slotted as shown at 6 to form strips bent at right angles around the bridge.

Either or both of these means can be used to impart the required resiliency to the clip. Furthermore, the angle included by the bend 4d can be an acute angle; this form of bend can suffice to keep the clip in place without the need for the rib 7.

The rib 7 may be extended by a tongue 9 for facilitating the fitting and removal of the clip. This tongue could be replaced by any kind of grip produced either by slotting out and bending up a portion of the clip, or by attaching thereto an element on which hold can be taken.

The invention can be used on virtually all ophthalmic or protective spectacles. In particular, it enables the user to fit different lenses in the same frame, depending, for example, upon the intensity of the outdoor light.

I claim:

1. A spectacle frame comprising:
   a pair of split lens-holding rings;
   a bridge split into an upper part and a lower part by a cut extending from one of said rings to the other, said parts being formed with respective ridges, each of said parts being integral with both rings, said cut having a stepped profile in a vertical transverse plane whereby said parts overlap over a predetermined range of relative vertical displacement; and
   a resilient clip engaging said bridge from above and from below for urging said parts into mutual contact along said cut, said clip having upper and lower extremities respectively curved about said ridges; one of said extremities being vertically slitted with formation of a multiplicity of parallel strips bent around the associated ridge.

2. A spectacle frame as defined in claim 1 wherein said clip has a midportion between said extremities curved toward said bridge and bearing upon same in the region of said cut.

3. A spectacle frame as defined in claim 1 wherein said stepped profile defines a vertical contact surface between said parts.

4. A spectacle frame as defined in claim 3 wherein one of said extremities curves around the associated projecting formation forwardly of said contact surface, the other of said extremities curving around the associated projecting formation rearwardly of said contact surfaces.

5. A spectacle frame as defined in claim 6 wherein said cut lies at a level farther from said one of said extremities forwardly of said contact surface and lies at a level farther from said other of said extremities rearwardly of said contact surface.

6. A spectacle frame comprising:
 a pair of split lens-holding rings;
 a bridge split into an upper part and a lower part by a cut extending from one of said rings to the other, said parts being formed with respective ridges, each of said parts being integral with both rings, said cut having a stepped profile in a vertical transverse plane defining a stepped profile defining a vertical contact surface between said parts whereby said parts overlap over a predetermined range of relative vertical displacement; and
 a resilient clip engaging said bridge from above and from below for urging said parts into mutual contact along said cut, said clip having upper and lower extremities respectively curved about said ridges; one of said extremities curving around the associated ridge forwardly of said contact surface, the other of said extremities curving around the associated ridge rearwardly of said contact surfaces.

* * * * *